No. 766,955. PATENTED AUG. 9, 1904.
R. KURKA.
FILTER PLANT.
APPLICATION FILED JUNE 17, 1901.
NO MODEL.

Witnesses:

Inventor:
per Richard Kurka
Theodor Heese
Attorney.

No. 766,955. Patented August 9, 1904.

UNITED STATES PATENT OFFICE.

RICHARD KURKA, OF FRANKFORT-ON-THE-MAIN, GERMANY.

FILTER PLANT.

SPECIFICATION forming part of Letters Patent No. 766,955, dated August 9, 1904.

Application filed June 17, 1901. Serial No. 64,808. (No model.)

*To all whom it may concern:*

Be it known that I, RICHARD KURKA, a subject of the King of Prussia, German Emperor, residing at Frankfort-on-the-Main, in the Province of Hesse-Nassau, Kingdom of Prussia, German Empire, have invented a new and useful Improvement in Filter Plants, of which the following is a specification.

The present invention relates to filter plants, and more particularly to stone filters.

The improved stone filter forming the subject of the invention can be used as an ordinary water-filter, a waste-water filter, and sewage-filter and is remarkable for the fact that the outflow and the reservoir for the filtered water are within the filtering arrangement, this being effected by giving the individual filter elements a suitable form and grouping them in a convenient manner. At the same time care is taken that the compartment containing the unfiltered water is perfectly shut off from the compartment for the filtered water and that the several elements are secure in their positions.

In order that my invention may be more readily understood, reference is had to the accompanying drawings, in which—

Figure 1:
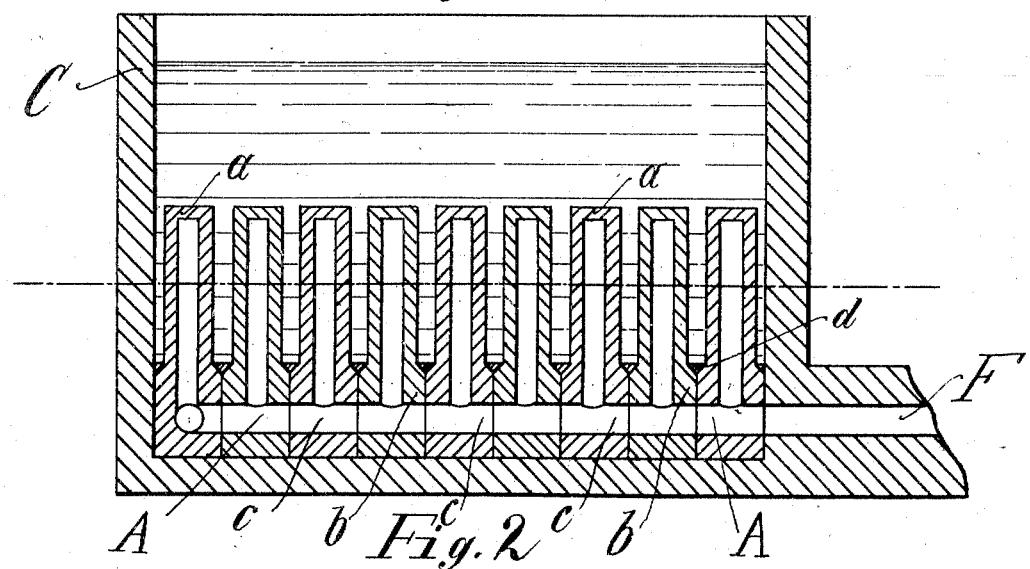
Figure 2:
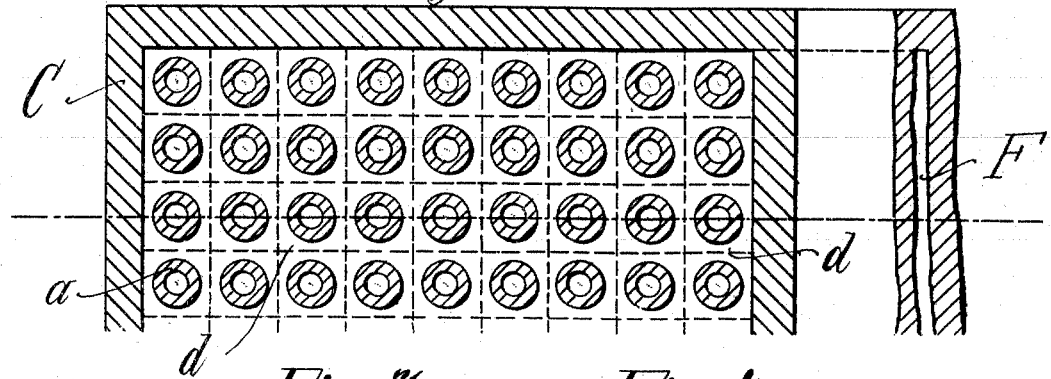
Figure 3:
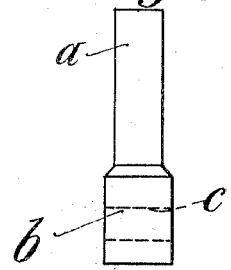
Figure 4:
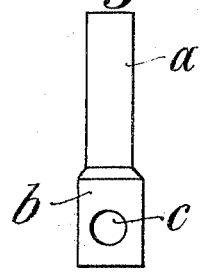

Figure 1 is a longitudinal section through a filtering plant according to my invention. Fig. 2 is a partial top view of Fig. 1; Fig. 3, an elevation of one of the filter elements; Fig. 4, an elevation at right angles to that of Fig. 3.

The filter elements are made of artificial or natural stone. The elements shown in Figs. 3 and 4 for the filtering plant (illustrated in Figs. 1 and 2) consist of an upper tubular portion $a$ and a lower cube-shaped portion $b$. The elements are closed at the top and at the bottom, and the cube-shaped portion $b$ has a horizontal bore $c$, which communicates with the interior of the tubular portion $a$. The elements are put together in the manner shown in Figs. 1 and 2—*i. e.*, they are placed in rows with their cube-shaped lower partitions so adjoining that a horizontal channel A is produced in each row near the bottom. The element B at one end of each row differs in form from the remainder in that the bore of its lower cube-shaped portion is only open toward the channel A, the opposite end being closed. Grappling-irons of well-known construction or similar means may be employed for holding the elements together.

C is the tank for the unfiltered water. The latter percolates inward through the walls of the tubular portions of the elements from without and is thus filtered. The filtered water then collects in the channels A, whence it can pass through the channel F to the place where it is to be used. As will be seen from Fig. 2, the said channel F is immediately connected with each of the channels A, as it extends along that side of the tank C where the channels A discharge their contents. As can be seen from the drawings, the compartments containing the unfiltered water are separated from those provided for the filtered water without the employment of any special means, the filtered water being contained in the bottom of the filtering arrangement itself. The bottom of the filter thus in a measure forms a reservoir for the filtered water without any further arrangements being necessary. In order that the filter-bottom may completely resist the pressure of the water where the bases of the element adjoin, the joints may be covered with layers of cement or other suitable material $d$.

What I claim as my invention, and desire to secure by Letters Patent of the United States, is—

In filter plants the combination with the tank C for the unfiltered water and the channel F for leading the filtered water to the place where it is to be used, of filter elements, each of them consisting in an upper, tubular portion $a$ closed at the upper end and a lower cube-shaped portion $b$ containing a transverse bore $c$ open at both ends, the said cube-shaped portions $b$ being so placed close together that they fill up the lowest part of the tank C and that they form the bottom of the filtering arrangement, substantially as set forth and for the purpose specified.

In witness whereof I subscribe my signature in presence of two witnesses.

RICHARD KURKA.

Witnesses:
GEORG WEISENSEE,
JEAN GRUND.